United States Patent [19]

Garotta

[11] Patent Number: 5,134,590
[45] Date of Patent: Jul. 28, 1992

[54] METHOD AND APPARATUS FOR CORRECTING THE RESPONSE OF SEISMIC SENSORS TO AN EMISSION SIGNAL THAT DOES NOT HAVE THE SAME SHAPE AS A REFERENCE SIGNAL

[75] Inventor: Robert Garotta, Chatenay-Malabry, France

[73] Assignee: Compagnie General de Geophysique, Cedex, France

[21] Appl. No.: 707,363

[22] Filed: May 29, 1991

[30] Foreign Application Priority Data

May 30, 1990 [FR] France .................. 90 06714

[51] Int. Cl.⁵ .............................. G01V 1/24
[52] U.S. Cl. ...................... 367/38; 367/43; 367/41; 364/421
[58] Field of Search .............. 367/189, 190, 24, 38, 367/45, 40–42; 181/108, 111, 112; 364/421

[56] References Cited

U.S. PATENT DOCUMENTS 3,984,805 10/1976 Silverman ..................... 367/42
4,564,927 1/1986 Kolb ............................. 367/42
4,890,264 12/1989 Crews et al. ................. 367/45

FOREIGN PATENT DOCUMENTS 0069408 1/1983 European Pat. Off. .
2594558 2/1987 France .

Primary Examiner—Brian S. Steinberger
Attorney, Agent, or Firm—Blakely Sokoloff Taylor & Zafman

[57] ABSTRACT

A method of correcting a seismic signal s(t) provided by a vibration sensor (100) in response to at least one emission signal F(t) produced by a least one seismic vibration generator (200). The real emission signal F(t) differs in phase and amplitude relative to a reference emission signal $\overline{F}$(t). The correction method of the invention consists in determining the phase difference $\Delta\phi$(f) and the amplitude ratio A(f) between the real emission signal F(t) and the reference emission signal $\overline{F}$(t) as a function of frequency f, and in applying the seismic signal s(t) from the vibration sensor (100) to a filter (304) whose response is defined in phase and amplitude respectively by $-\Delta\phi$(f) and by 1/A(f).

8 Claims, 3 Drawing Sheets

METHOD AND APPARATUS FOR CORRECTING THE RESPONSE OF SEISMIC SENSORS TO AN EMISSION SIGNAL THAT DOES NOT HAVE THE SAME SHAPE AS A REFERENCE SIGNAL

The present invention relates to a method of correcting a seismic signal s(t) provided by a vibration sensor in response to an emission signal F(t) produced by at least one seismic vibration generator, said emission signal F(t) having phase and amplitude errors relative to a reference emission signal $\overline{F}(t)$.

The invention also relates to apparatus for correcting a seismic signal s(t) provided by a vibration sensor in response to an emission signal F(t) produced by at least one seismic vibration generator comprising a vibrating plate resting on the ground and connected to a reaction mass put into motion by a hydraulic circuit to which a pilot signal P(t) is applied, which pilot signal is representative of a reference emission signal $\overline{F}(t)$, with the real emission signal F(t) having phase and amplitude errors relative to the reference emission signal $\overline{F}(t)$.

The method and apparatus of the invention are most advantageously applied to the field of geophysical prospecting by seismic ground survey.

BACKGROUND OF THE INVENTION

U.S. Pat. No. 4,724,532 describes a seismic vibration generator of the type specified in the preamble and operating by applying pressure variations to the hydraulic circuit acting on the reaction mass, where the pressure variations comply with a law defined by a predetermined pilot signal P(t) that is proportional to the reference emission signal $\overline{F}(t)$ that the operator desires to apply to the ground surface. In general, the pilot signal P(t) is an alternating signal of constant amplitude whose frequency is continuously variable, e.g. in the range 10 Hz to 70 Hz.

However, the large masses put into motion in such seismic vibration generators (which masses may be as much as 15 tons to 20 tons), and the coupling with the ground and the forces applied thereto make it difficult to servo-control the emission signal F(t) to the pilot signal. As a result the emission signal does not have the same shape as the intended signal $\overline{F}(t)$, so the seismic signal s(t) detected by the vibration sensors cannot be properly interpreted on the basis of the reference emission signal $\overline{F}(t)$. It is therefore essential to apply a correction to the seismic signal s(t) to take account of the difference in shape between the emission signal and the reference signal, if reliable and reproducible results are to be obtained.

Examples of interfering phenomena that may spoil the proportionality between the emission signal F(t) and the pilot signal P(t) include the following: rocking of the seismic vibration generator assembly, due for example to various causes such as the vibrating plate being placed in non-symmetrical equilibrium on the ground or the axis of the structure being non-vertical; overall or local deformation of the structure caused by the large mechanical stresses exerted thereon by the hydraulic system; deformation of the vibrating plate; and rocking of the reaction mass on its longitudinal axis, with such rocking being due to mechanical play between the vibrating mass and its drive piston having the effect of making the assembly constituted by the reaction mass and the vibrating plate different from a system having minimum phase shift relative to the modulation-controlling pilot signal. All this makes the generated vibration difficult to correct. In particular, the generated vibration includes a harmonic content which is difficult to correct, and interfering frequencies which interfere with servo-control and which are difficult to eliminate.

Thus, the technical problem to be solved by the present invention is to provide a correction method and correction apparatus making it easy to apply very accurate correction to the seismic signal s(t), to take account once and for all of all of the causes of difference between the emission signal F(t) and the reference emission signal $\overline{F}(t)$.

SUMMARY OF THE INVENTION

In a first aspect, the present invention provides a method of correcting a seismic signal s(t) provided by a vibration sensor in response to at least one emission signal F(t) produced by at least one seismic vibration generator, said emission signal F(t) having phase and amplitude errors relative to a reference emission signal $\overline{F}(t)$, said correction method consisting in determining the phase difference $\Delta\phi(f)$ and the amplitude ratio A(f) between the emission signal F(t) and the reference emission signal $\overline{F}(t)$ as a function of frequency f, and in applying the seismic signal s(t) from the vibration sensor to a filter whose response is defined in phase and amplitude respectively by $-\Delta\phi(f)$ and by $1/A(f)$, wherein said emission signal F(t) is produced by a plurality N of seismic vibration generators each emitting a respective emission signal $F_i(t)$ (i=1, ..., N) having respective phase and amplitude errors $\Delta\phi_i(f)$ and $A_i(f)$, with the total phase difference $\Delta\phi(f)$ and the total amplitude ratio A(f) being obtained for each frequency f by vector addition of the respective phase and amplitude errors $\Delta\phi_i(f)$ and $A_i(f)$.

In a second aspect, the present invention provides correction apparatus for correcting a seismic signal s(t) provided by a vibration sensor in response to at least one emission signal F(t) produced by at least one seismic vibration generator, the apparatus comprising:

a vibrating plate resting on the ground and connected to a reaction mass put into motion by a hydraulic circuit having a pilot signal P(t) applied thereto representative of a reference emission signal $\overline{F}(t)$, the resulting emission signal F(t) having phase and amplitude errors relative to the reference signal $\overline{F}(t)$;

measurement means for measuring said emission signal F(t);

comparator means for comparing the emission signal F(t) delivered by said measurement means with the reference emission signal $\overline{F}(t)$ and for providing the phase difference $\Delta\phi(f)$ and the amplitude ratio A(f) between the emission signal F(t) and the reference emission signal $\overline{F}(t)$ as a function of frequency; and a filter of phase and amplitude defined by $-\Delta\phi(f)$ and $1/A(f)$, which filter is applied to the seismic signal s(t) to provide a corrected seismic signal $\overline{s}(t)$;

wherein said correction apparatus comprises a plurality N of seismic vibration generators each emitting a respective emission signal $F_i(t)$ (i=1, ..., N) having respective phase and amplitude errors $\Delta\phi_i(t)$ and $A_i(t)$, and vector addition means for performing vector addition on the respective errors $\Delta\phi_i(f)$ and $A_i(f)$ to provide a total phase difference $\Delta\phi(f)$ and a total amplitude ratio A(f).

In other words, the method and apparatus of the invention are based on determining the characteristics of a notional filter that would transform the reference emission signal $\overline{F}(t)$ into a degraded version of the real emission signal F(t), and then applying the inverse of said notional filter to the detected seismic signal s(t).

BRIEF DESCRIPTION OF THE DRAWINGS

Embodiments of the invention are described by way of example with reference to the accompanying drawings, in which:

FIG. 2b is a diagram of the emission signal F(t) corresponding to the pilot signal of FIG. 2a;

FIG. 2c shows the frequency spectrum of the pilot signal of FIG. 2a;

FIG. 4 is a diagram showing the vector addition implicit in the variant of FIG. 3;

DETAILED DESCRIPTION

Figure 1:
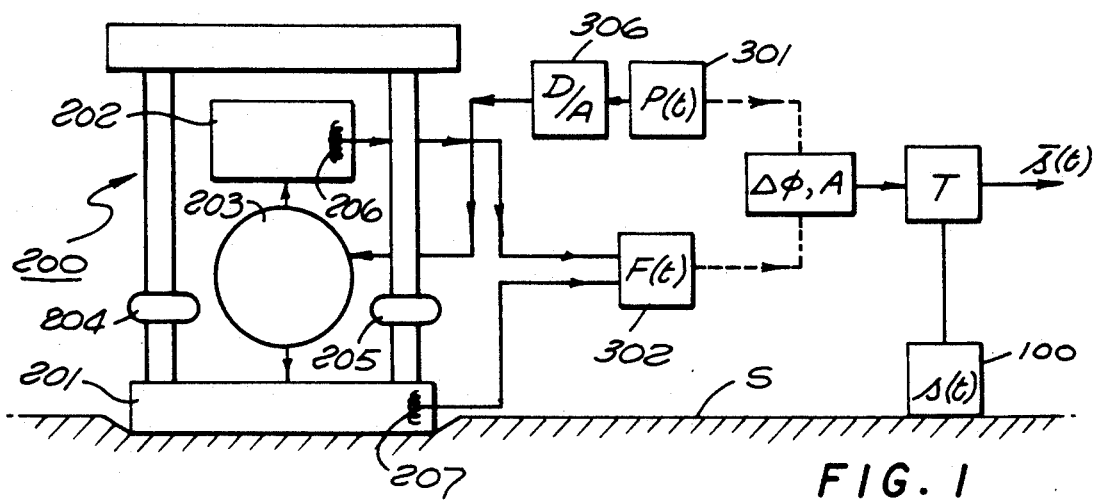
FIG. 1 is a block diagram of apparatus implementing the correction method of the invention.

FIG. 1 is a diagram showing apparatus for correcting a seismic signal s(t) provided by a vibration sensor 100 in response to at least one emission signal F(t) produced by a seismic vibration generator 200 when said emission signal F(t) includes phase and amplitude errors relative to a reference emission signal $\overline{F}(t)$.

The seismic vibration generator 200 of FIG. 1 may, for example, be of the type mounted on a land vehicle and conventionally comprises a vibrating plate 201 placed on the ground S and mechanically coupled thereto by the weight of the entire vehicle. A hydraulic circuit 203 acts on a reaction mass 202, thereby causing the vibration plate 201 to vibrate. At rest, a mechanical system (not shown in FIG. 1) serves to put the vehicle close to the limiting position where its supporting wheels leave the ground, at which point the ground S beneath the vibrating plate 201 is subjected to a constant force −F due to the overall weight constituted by the vibration generator 200 and the vehicle carrying it. Since the vehicle should under no circumstances be subjected to the vibrations generated by the hydraulic circuit 203 and transmitted by the vibrating plate 231 to the ground, the vehicle is decoupled from the vibrating plate 201 by means of shock absorbers 204 and 205 constituted by conventional air bags.

Figure 2A:
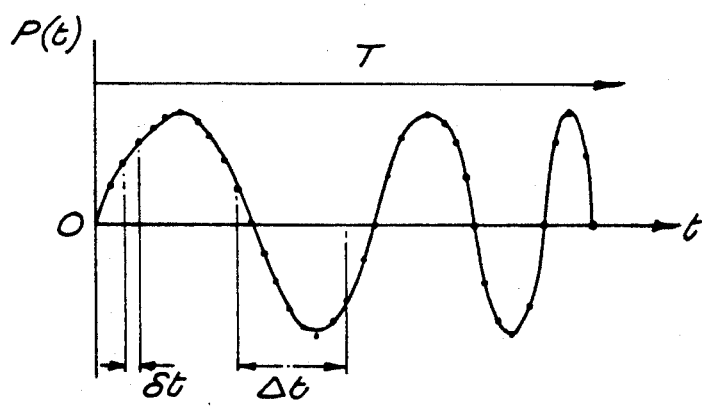
FIG. 2a is a waveform diagram of a typical pilot signal P(t)
Figure 2B:
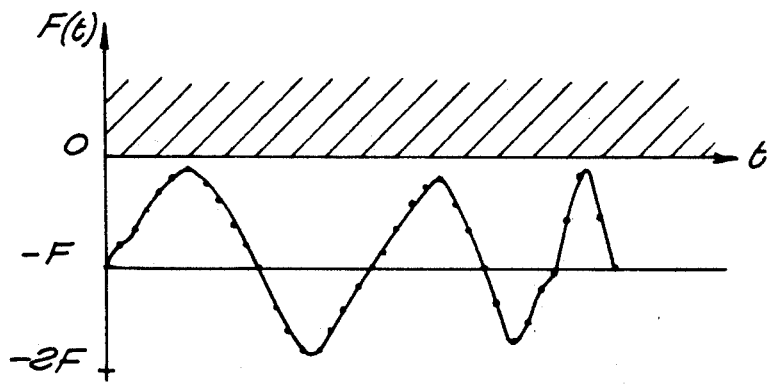
Figure 2C:
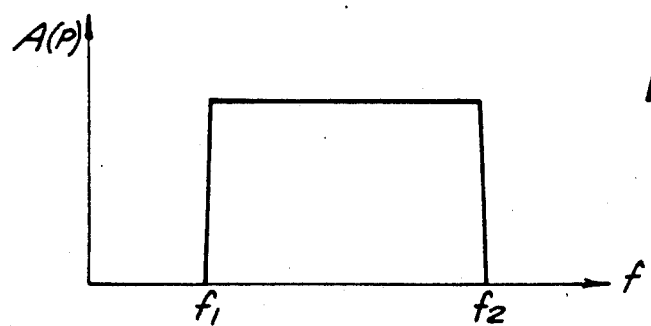

In operation, the pressure of the oil in the hydraulic circuit 203 is modulated as a function of time to comply with variations imposed by a "pilot" signal P(t) which is stored on a permanent basis in digital form in a memory 301 of the seismic vibration generator 200, with samples being at intervals δt of 2 ms, for example. As shown by the waveform diagram of FIG. 2a, the pilot signal P(t) is an alternating signal of amplitude defined as a function of time, and assumed to be constant in this case, but having a frequency which is continuously variable between a low frequency $f_1$ of about 10 Hz and a high frequency $f_2$ of about 70 Hz. The spectrum A(P) corresponding to the pilot signal of FIG. 2a and given in FIG. 2c is characterized between $f_1$ and $f_2$ by an amplitude which is independent of frequency f. The pilot signal P(t) is applied to the hydraulic circuit by an analog-to-digital converter circuit 306 for a length of time T of about 15 seconds, for example.

If the mechanical assembly constituted by the seismic vibration generator 200 and the ground were mechanically perfect, then the emission signal would be a reference emission signal $\overline{F}(t)$ exactly similar to the pilot signal P(t) and varying between 0, the limit at which the vibrating plate 201 leaves the ground, and −2 F. However, for reasons mentioned above, the real emission signal F(t) as shown in FIG. 2b is not identical in phase and amplitude with the reference signal $\overline{F}(t)$. In other words, in the frequency domain, the signal F(t) does not have the desired amplitude as a function of frequency f but has an error A(f) relative to the reference emission signal $\overline{F}(t)$, where A(f) is defined as being the ratio, at frequency f, between the amplitude of the signal F(t) and the amplitude of $\overline{F}(t)$. Similarly, the real emission signal F(t) has a non-zero phase difference $\Delta\phi(f)$ relative to $\overline{F}(t)$ and thus relative to the pilot signal P(t), which difference varies with frequency.

In practice, the emission signal F(t) is measured using accelerometers 206 and 207 fixed respectively to the reaction mass 202 and to the vibrating plate 201 and measuring respective accelerations $a_M$ and $a_P$. An adder circuit 302 performs weighted addition:

$$F(t) = m_M \cdot a_M + m_P \cdot a_P$$

where $m_M$ and $m_P$ are the masses respectively of the reaction mass and of the vibrating plate. The signal F(t) is sampled at the same sampling interval δt as the pilot signal P(t).

After inputting the seismic signal s(t) delivered by the vibration sensor 100 in response to the emission signal F(t), and before interpreting the results, a correction operation is performed on the signal s(t) so as to take account of the differences between the signal F(t) and the reference signal $\overline{F}(t)$. To this end, the signal F(t) is compared with the reference signal $\overline{F}(t)$ or with the pilot signal P(t) which is proportional thereto, so as to determine the errors $\Delta\phi(f)$ and A(f). For example, this comparison may be performed by a circuit 303 determining the cross-correlation between F(t) and $\overline{F}(t)$ over time intervals Δt of about 500 ms, thus producing about thirty values for $\Delta\phi(f)$ and A(f). Thereafter, a digitally calculated filter 304 having a transfer function T(f) which is defined in phase and amplitude by $-\Delta\phi(f)$ and 1/A(f) is applied to the signal s(t) so as to obtain a corrected seismic signal $\overline{s}(t)$ including corrections to compensate for the differences between the signals F(t) and $\overline{F}(t)$.

Correction may be performed in frequency space: after applying the Fourier transform to the signal s(t) to obtain s(f), the filtering operation $\overline{s}(f) = T(f) \, s(f)$ is applied to the signal s(f). The inverse Fourier transform then transforms $\overline{s}(f)$ to $\overline{s}(t)$. It is also possible to establish the impulse response Imp(t) of the filter 304 corresponding to the transfer function T(f) and to obtain the convolution product of Imp(t) and s(t) directly in time space:

$$\overline{s}(t) = \text{Imp}(t) \otimes s(t)$$

Figure 6A:
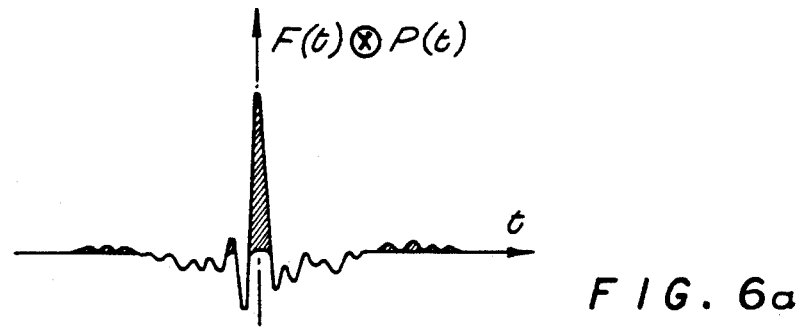
FIG. 6a shows the experimentally obtained cross-correlation function between a pilot signal P(t) and an emission signal F(t)
Figure 6B:
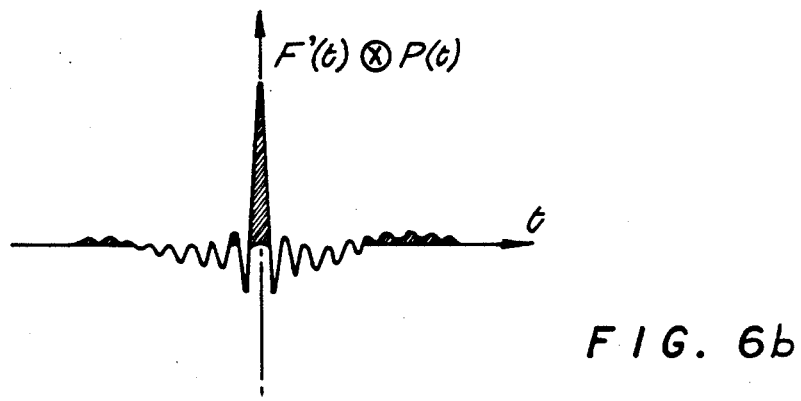
FIG. 6b shows the cross-correlation function of FIG. 6a after a correction has been applied to the emission signal F(t).

FIGS. 6a and 6b show results obtained experimentally by the Applicant showing the effect of the corrections performed by the method and the apparatus of the invention. In FIGS. 6a and 6b, the correction has not, in fact, been performed on the seismic signal s(t) itself, but on the emission signal F(t), which is equivalent thereto. FIG. 6a shows the convolution product F(t) ⊛ P(t) between the signal F(t) and the pilot signal P(t) which product would give a Dirac peak if F(t) were equal to the reference signal $\bar{F}(t)$. However, it can be seen in FIG. 6 that in addition to waves due to the fact that the pilot signal is limited in frequency, the signal F(t) ⊛ P(t) is asymmetrical, which means there are large phase differences. FIG. 6b shows the convolution product F'(t) ⊛ P(t) in which F'(t) is the emission signal F(t) which has been corrected by applying the impulse response filter Imp(t) thereto. It can clearly be seen from FIG. 6b that symmetry has been greatly improved, and this is due in particular to taking phase differences into account.

Figure 3:
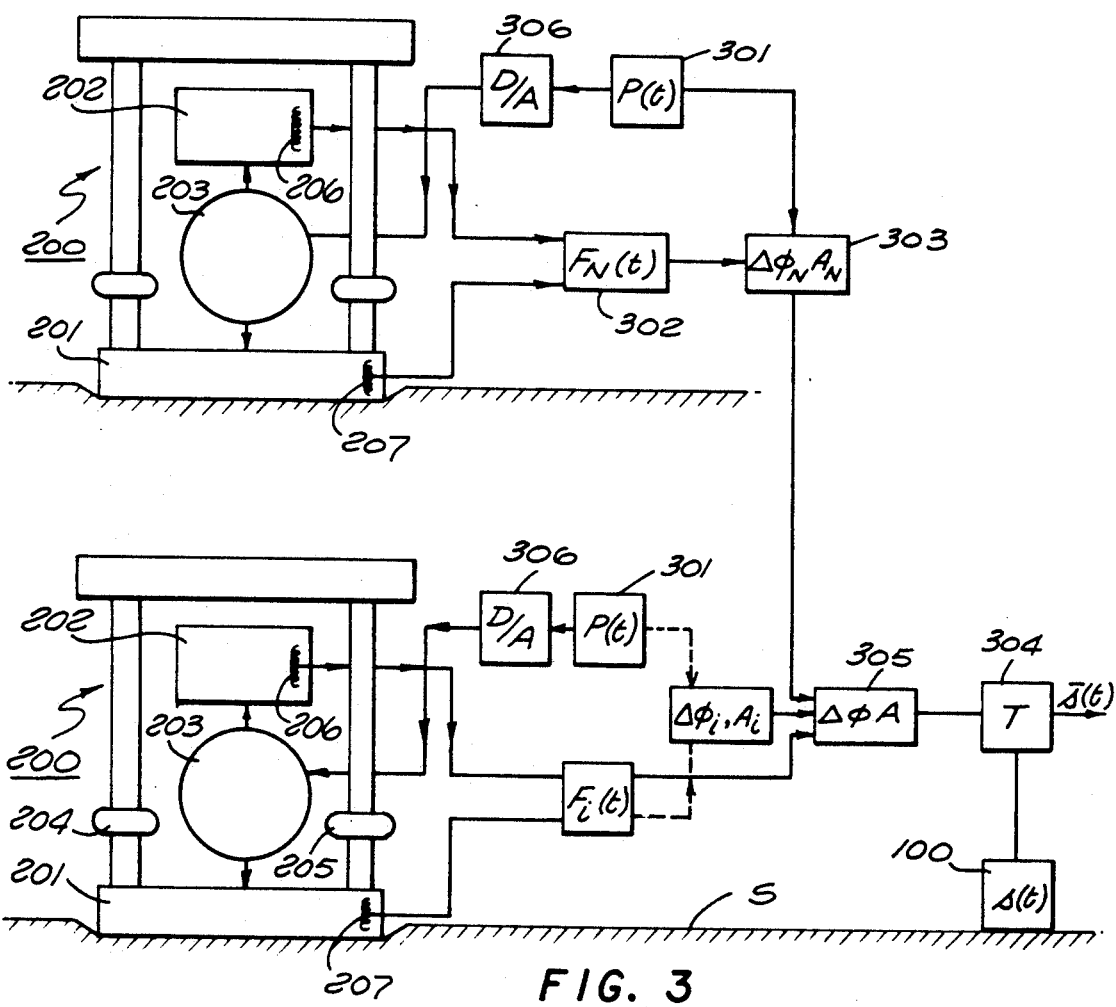
FIG. 3 is a diagram of a first variant embodiment of the FIG. 1 apparatus.

FIG. 3 is a block diagram of correction apparatus analogous to that shown in FIG. 1 and operating with a plurality of N seismic vibration generators. In this case, each apparatus i (i = 1, ..., N) provides an output emission signal $F_i(t)$ produced using a pilot signal P(t) which may be identical for all of the generators. After the resulting seismic signal s(t) has been recorded, N pairs of parameters $\Delta \phi_i(f)$ and $A_i(f)$ are obtained for the vibration generators as described above. Then, vector addition means 305 provide the total phase difference $\Delta \phi(f)$ and the total amplitude ratio A(f) defining the correction filter 304. In the case of N = 2 seismic vibration generators, FIG. 4 shows how vector addition is performed to calculate $\Delta \phi(f)$ and s(f) as a function of $\Delta \phi_1(f)$, $A_1(f)$ and $\Delta \phi_2(f)$, $A_2(f)$.

Figure 5:
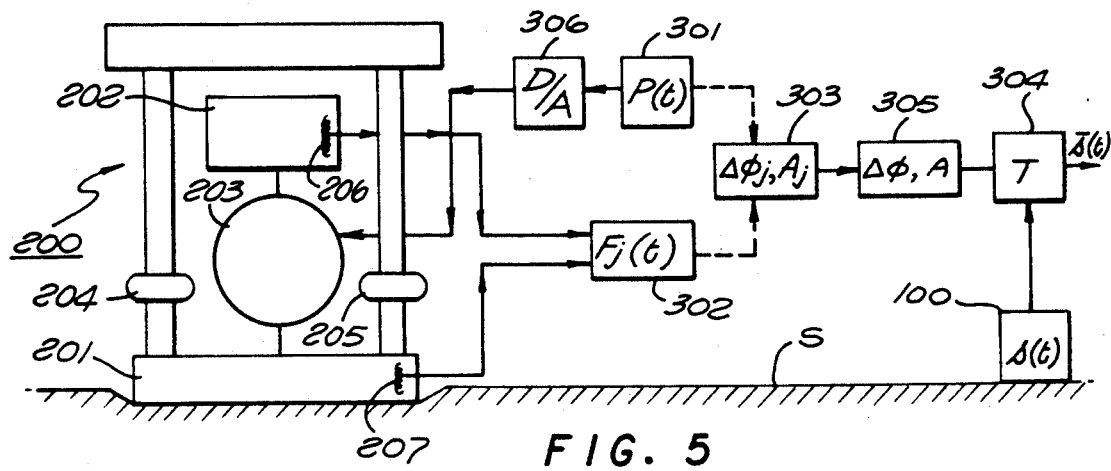
FIG. 5 is a diagram of a second variant implementation of the apparatus of FIG. 1.

In equivalent manner, FIG. 5 is a diagram of correction apparatus including a seismic vibration generator emitting a signal F(t) constituted by the sum of M successive individual emission signals $F^j(t)$ where j = 1, ..., M, having respective phase and amplitude errors $\Delta \phi^j(f)$ and $A^j(f)$ relative to the same reference emission signal. As shown in FIG. 5, the correction apparatus includes means 305 for performing vector addition on the errors $\Delta \phi^j(f)$ and $A^j(t)$ providing the total phase difference $\Delta \phi(f)$ and the total amplitude ratio A(f) on the principle shown in FIG. 4.

Naturally the vector addition mechanism applies in the same manner with a plurality of seismic generators each providing a plurality of emission signals.

I claim:

1. A correction method for correcting a seismic signal s(t) provided by a vibration sensor in response to at least one emission signal F(t) produced by a plurality of N seismic vibration generators, each emitting a respective emission signal $F_i(t)$ (i = 1, ... N) relative to a reference emission signal $\bar{F}(t)$, said correction method comprising the steps of;
   determining a phase difference $\Delta \phi_i(f)$ and an amplitude ratio $A_i(f)$ between each emission signal $F_i(t)$ and the reference emission signal $\bar{F}(t)$ as a function of frequency f;
   computing a phase difference $\Delta \phi(f)$ and amplitude ratio A(f) for each frequency f by vector addition of the phase errors $\Delta \phi_{i \to N}(f)$ and amplitude errors $A_{i \to N}(f)$; and,
   applying the seismic signal s(t) from the vibration sensor to a filter whose response is defined in phase and amplitude respectively by $-\Delta \phi(f)$ and by $1/A(f)$.

2. A correction method according to claim 1, wherein said emission signal F(t) is the sum of M successive individual emission signals $F^j(t)$ (j = 1, ..., M) having respective phase and amplitude errors $\Delta \phi^j(f)$ and $A^j(f)$ relative to the same reference emission signal $\bar{F}(t)$, the total phase difference $\Delta \phi(f)$ and the total amplitude ratio A(f) being obtained for each frequency f by vector addition of the respective phase and amplitude errors $\Delta \phi^j(f)$ and $A^j(f)$.

3. A correction method according to claim 1, in which the phase and amplitude errors are obtained by cross-correlation between the emission signal and the reference emission signal.

4. A correction method according to claim 2, in which the phase and amplitude errors are obtained by cross-correlation between the emission signal and the reference emission signal.

5. Correction apparatus for correcting a seismic signal s(t) provided by a vibration sensor in response to at least one emission signal F(t) produced by a plurality of N vibration generators, each emitting a respective emission signal $F_i(t)$ (i = 1, ... N), the apparatus comprising:
   a plurality of vibrating plates each resting on the ground and connected to a reaction mass put into motion by a hydraulic circuit having a pilot signal P(t) applied thereto representative of a reference emission signal $\bar{F}(t)$, the resulting emission signal F(t) having phase and amplitude errors relative to the reference signal $\bar{F}(t)$;
   measurement means for measuring said emission signal F(t);
   comparator means for comparing the emission signal F(t) delivered by said measurement means with the reference emission signal $\bar{F}(t)$ and for providing a phase difference $\Delta \phi_i(f)$ and an amplitude ratio $A_i(f)$ between the emission signals $F_i(t)$ and the reference emission signal $\bar{F}(t)$ as a function of frequency; and
   vector addition means for performing vector addition on the respective errors $\Delta \phi_i(f)$ and $A_i(f)$ to provide a total phase difference $\Delta \phi(f)$ and a total amplitude ratio A(f); and,
   a filter of phase and amplitude defined by $-\Delta \phi(f)$ and 1/A(f), which filter is applied to the seismic signal s(t) to provide a corrected seismic signal s(t).

6. Correction apparatus according to claim 5, wherein said emission signal F(t) is the sum of M successive individual emission signals $F^j(t)$ (j = 1, ... M) have individual phase and amplitude errors $\Delta \phi^j(f)$ and $A^j(f)$ relative to the same reference emission signal $\bar{F}(t)$, said vector addition means performing vector addition on the individual errors $\Delta \phi^j(f)$ and $A^j(f)$ to provide the total phase difference $\Delta \phi(f)$ and the total amplitude ratio A(f).

7. Correction apparatus according to claim 5, wherein said comparator means are constituted by a circuit for obtaining the cross-correlation between the emission signal and the reference emission signal.

8. Correction apparatus according to claim 6, wherein said comparator means are constituted by a circuit for obtaining the cross-correlation between the emission signal and the reference emission signal.

* * * * *

UNITED STATES PATENT AND TRADEMARK OFFICE
CERTIFICATE OF CORRECTION

PATENT NO. : 5,134,590
DATED : July 28, 1992
INVENTOR(S) : Garotta

It is certified that error appears in the above-indentified patent and that said Letters Patent is hereby corrected as shown below:

On the title page:

[73] Assignee: delete "Compagnie General de Geophysique"

insert --Compagnie Generale de Geophysique --

Signed and Sealed this

Seventeenth Day of October, 1995

*Attest:*

BRUCE LEHMAN

*Attesting Officer*   Commissioner of Patents and Trademarks